March 19, 1963 R. E. RADFORD 3,081,790
VALVES
Filed Aug. 15, 1960
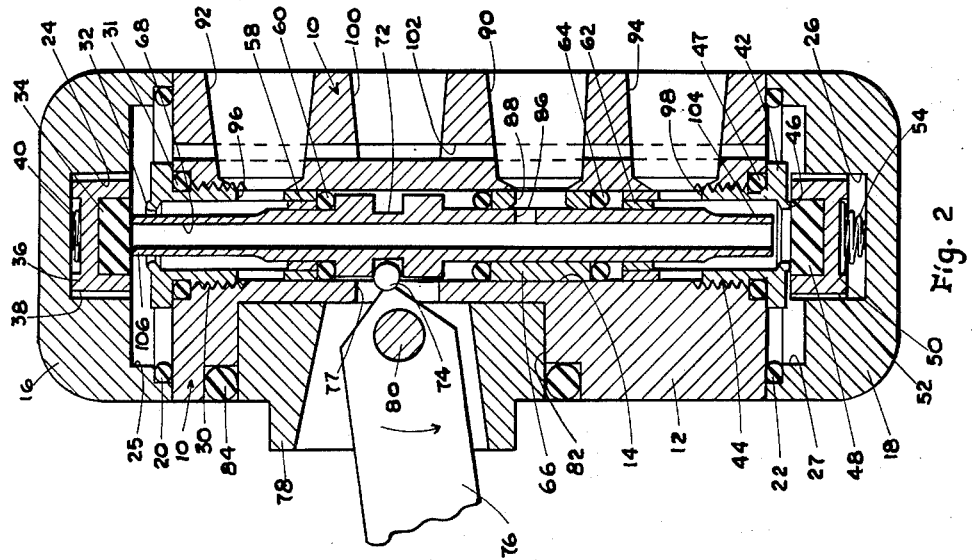
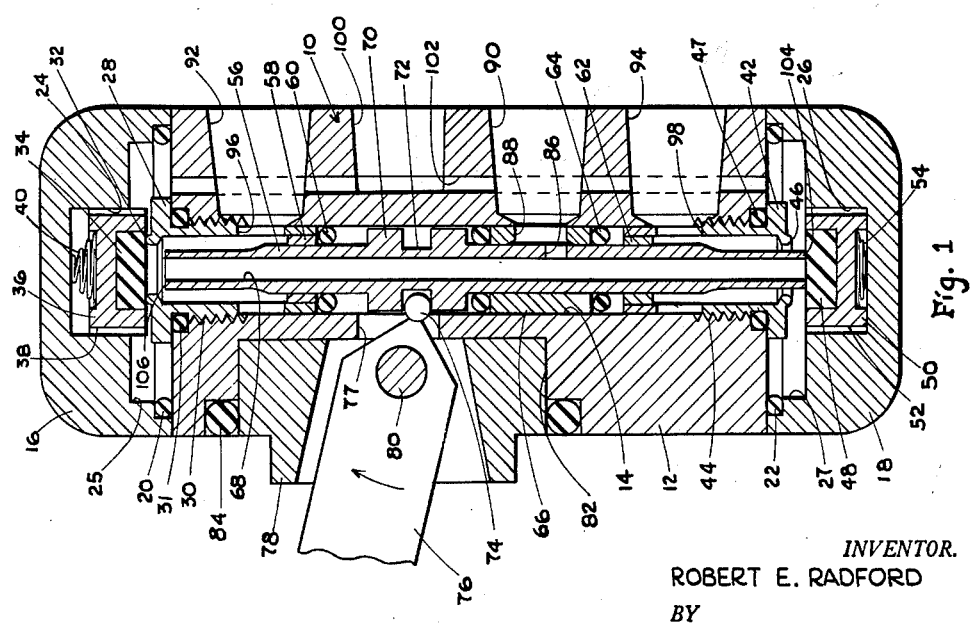
INVENTOR.
ROBERT E. RADFORD
BY United States Patent Office
3,081,790
Patented Mar. 19, 1963

3,081,790
VALVES
Robert E. Radford, 809 N. Lewis, Tulsa, Okla.
Filed Aug. 15, 1960, Ser. No. 49,576
4 Claims. (Cl. 137—413)

This invention relates to improvements in valves, and more particularly, but not by way of limitation, to a valve for shunting the flow of a fluid to control a fluid flow system.

It is frequently desirable to control the flow of fluid in a fluid flow system to provide for an efficient treating of the fluid, or for an efficient operation of the entire system. For example, in the oil production industry, the well fluid is normally directed through a plurality of treating operations prior to the delivery thereof to a consumer. The well stream is usually directed through a separator apparatus wherein it is important to maintain the liquid level or the interface level at a predetermined position therein. During the treating of the well stream, the fluid is normally moved through a filter apparatus for removal of undesirable particles therefrom, and the filter members frequently become clogged whereby the fluid pressure may build up sufficiently for rupturing the filter member. When this occurs, the well fluid may move into the remaining portions or steps of the treating operation through a ruptured filter, or may be delivered for refining, or the like, after bypassing the filtering process, thus resulting in an unfiltered fluid being mixed with the treated fluid, which is highly undesirable.

The present invention contemplates a novel valve for automatically shunting the fluid in a fluid flow system for intermittently exhausting the fluid to atmosphere, or altering the direction of flow thereof in accordance with the desired control conditions, thus maintaining an efficient control of the entire system. The control valve is provided with a reciprocal valve stem providing multiple valve ports for shunting the flow of the fluid therethrough in response to variable operating conditions of the system. In order to maintain a substantially constant fluid level within a vessel, or the like, the valve stem is reciprocated in accordance with variations of the fluid level for alternately supplying the vessel with fluid or exhausting the fluid therefrom, as required. When it is desired to control the flow of fluid through a system in response to pressure increases, the valve may be adapted for reciprocation of the stem in response to the pressure increases for exhausting the fluid to atmosphere, or otherwise diverting the flow thereof, as desired.

It is an important object of this invention to provide a valve for automatically controlling the flow of a fluid in a fluid flow system.

It is another object of this invention to provide a novel control valve responsive to variable conditions in a fluid flow system for automatically shunting the flow of the fluid therethrough.

Another object of this invention is to provide a novel valve having multiple valve ports alternately opened and closed by a common valve stem.

Still another object of this invention is to provide a control valve for automatically diverting the flow of a fluid therethrough for alternately opening and closing remotely disposed valves.

A further object of this invention is to provide a novel control valve for automatically interrupting the flow of fluid in a fluid flow system whereby the fluid will not move through the system under adverse conditions therefor, thus assuring that undesirable fluid will not be delivered for ultimate utilization thereof.

A still further object of this invention is to provide a novel control valve which is simple and efficient in operation and economical and durable in construction.

Other objects and advantages of the invention will be evident from the following detailed description, read in conjunction with the accompanying drawings, which illustrate my invention.

In the drawings:

FIGURE 1 is a sectional elevational view of a valve embodying the invention.

FIGURE 2 is a view similar to FIG. 1 depicting the valve in another position for directing the flow of fluid therethrough.

Referring to the drawings in detail and particularly FIGS. 1 and 2, reference character 10 refers in general to a valve comprising a housing 12 having a central bore 14 extending therethrough. A pair of substantially identical cover members 16 and 18 are secured to the opposed ends of the housing 12 in any suitable manner (not shown). Suitable sealing ring members 20 and 22 are interposed between the housing 12 and the cover members 16 and 18, respectively, for precluding leakage of fluid therebetween, as is well known. The cover member 16 is provided with a central bore or recess 24 in alignment with the bore 14 of the body or housing 12. The recess 24 is enlarged at 25 to provide a fluid chamber. The cover 18 is provided with a similar recess 26 in alignment with the bore 14 and enlarged at 27 to provide a fluid chamber for a purpose as will be hereinafter set forth.

A bushing member 28 is threadedly secured at 30 to the bore 14 and is provided with a centrally disposed valve port 32. An O-ring 31 or other suitable sealing member is interposed between the bore 14 and the bushing 28 for precluding leakage of fluid therebetween. A valve seat member 34 cooperates with the port 32 for alternately opening and closing thereof, and is carried by a seat retainer member 36 reciprocally disposed in the recess 24. The retainer member 36 is preferably provided with a plurality of circumferentially spaced longitudinally extending grooves or flutes 38 on the outer periphery thereof whereby fluid within the chamber 25 will not hinder the reciprocal movement of the retainer member 36. A suitable spring member 40 has one end anchored in the recess 24 and the opposite end anchored to the retainer member 36 for constantly urging the retainer 36 and the valve seat 34 carried thereby in a direction toward the valve port 32.

A second bushing member 42 is threadedly secured at 44 to the opposite end of the bore 14 and is provided with a centrally disposed valve port 46. A suitable sealing member 47 is interposed between the bore 14 and the bushing 42 for precluding leakage of fluid therebetween. A second valve seat member 48 cooperates with the valve port 46 for alternate opening and closing thereof and is carried by a second seat retainer member 50 which is reciprocally disposed within the recess 26. The outer periphery of the retainer member 50 is provided with a plurality of circumferentially spaced grooves or flutes 52 whereby fluid contained in the chamber 27 will not hinder the reciprocal movement of the retainer member 50. A suitable spring member 54 has one end anchored in the recess 26 and the opposite end anchored on the retainer 50 for constantly urging the retainer 50 and the valve seat 48 carried thereby in a direction toward the valve port 46.

A valve stem, generally indicated at 56, is reciprocally disposed within the bore 14 and extends through the oppositely disposed bushings 28 and 42, as clearly shown in FIGS. 1 and 2. A spacer ring 58 is interposed between the stem 56 and the bushing 28 for guiding the reciprocal movement of the stem therein, and an O-ring or sealing member 60 is disposed around the valve stem 56 in the proximity of the sleeve 58 for precluding leakage of fluid around the stem, as will be hereinafter set forth. A similar spacer ring 62 is interposed between the stem 56 and the second bushing 42 for guiding the stem 56, and an O-ring or sealing member 64 is disposed around the stem 56 in the proximity of the sleeve 62 for precluding leakage of fluid as will be hereinafter set forth. A guide sleeve 66 is disposed in the bore 14 around the stem 56 and spaced between the bushings 28 and 42 and is rigidly secured within the bore 14 in any well known manner (not shown). A suitable sealing ring 67 is disposed around the stem 56 above the sleeve 66, as viewed in the drawings.

The valve stem 56 is provided with a longitudinally extending central bore 68 which is open at both ends thereof in order to provide a fluid passageway therethrough. It will be apparent that the open ends of the passageway 68 provide valve ports for cooperation with the valve seats 34 and 48, as will be hereinafter set forth. The outer diameter of the stem 56 is enlarged at 70 and rides freely within the bore 14 upon reciproctaion of the stem therein. An annular groove 72 is provided in the enlarged portion 70 for receiving a ball shaped end 74 of any suitable lever arm 76 which may be of any suitable operating linkage mechanism, such as a float member or the like (not shown). The arm 76 extends through a bore or slot 77 provided in the housing 12. The arm 76 is pivotally secured within a sleeve or housing 78 by a suitable pivot pin 80. The housing 78 is suitably secured within a bore 82 provided in the side wall of the housing 12, and an annular sealing member, such as an O-ring 84, is interposed therebetween for precluding leakage of fluid therearound. It will be apparent that any pivotal movement of the arm 76 will cause the end 74 thereof disposed within the groove 72 to reciprocate the valve stem 56 within the bore 14, as will hereinafter be set forth in detail.

The valve stem 56 is further provided with an aperture or bore 86 extending through the side wall thereof open to an aperture 88 provided in the centrally disposed guide sleeve 66. The aperture 88 of the sleeve 66 is preferably of a size whereby the bore 86 will remain open thereto regardless of the length of travel of the valve stem 56 upon reciprocation thereof, thus providing a constant communication with the central bore 68. The housing 12 is provided with an exhaust or outlet port 90 in alignment with the bore 88. The housing 12 is further provided with an upper port 92, as viewed in FIGS. 1 and 2, and a lower port 94. The bushing 28 is provided with a plurality of circumferentially spaced apertures 96 in substantial alignment with the upper port 92 whereby fluid from the port 92 may be directed into the interior of the bushing 28. Similarly, the bushing 42 is provided with a plurality of circumferentially spaced apertures 98 in substantial alignment with the lower port 94 whereby fluid may be directed from the port 94 into the interior of the bushing 42.

The housing 12 is further provided with a fluid inlet port 100 which extends radially therein for communicating with a longitudinal bore 102. The bore 102 extends through the body 12 to provide simultaneous communication between the inlet port 100 and the chambers 25 and 27. The inlet port 100 is depicted in FIGS. 1 and 2 as being in alignment with the ports 90, 92 and 94, for purposes of illustration. However, the inlet port 100 is actually off-set from the bores 90, 92 and 94, and the bore 102 by-passes the ports 90, 92 and 94 as indicated in dotted lines in FIGS. 1 and 2. Thus, fluid entering the housing 12 through the port 100 will be directed simultaneously to the chambers 25 and 27 without contact with the bores 90, 92 and 94.

*Operation*

When it is desired to maintain a substantially constant level of a fluid within a vessel, or the like (not shown), the valve 10 may be secured to the vessel in any suitable manner (not shown) whereby the link arm 76 will be pivoted about the pin 80 in response to fluctuations of the fluid level, as is well known. Normally, the fluid within the vessel will fill or partially fill the interior of the sleeve 78 and will be directed into the bore 14 surrounding the enlarged portion 70 of the stem 56. However, the sealing members 60 and 67 will preclude leakage of fluid around the stem 56 into any of the bores 90, 92 or 94. Fluid from a supply vessel (not shown) is directed into the inlet port 100 and moves through the bore 102 into the chambers 25 and 27. In the normal horizontal position of the lever arm 76 (not shown), the valve stem 56 is centrally disposed within the bore 14 whereby the valve seat 34 is retained in a sealing position against the valve port 32 by the spring 40, and the valve seat 48 is retained in a sealing position against the valve port 46 by the spring 54. In addition, the lower end 104 of the stem 56 will be in a sealing position against the valve seat 48, and the upper end 106 of the stem 56 will be in a sealing position against the seat 34.

In the event the fluid level within the vessel rises, the link arm 76 will be pivoted in a clockwise direction about the pin 80 as indicated by the arrow in FIG. 1. The ball end 74 of the arm 76 will thus be moved downwardly toward the position depicted in FIG. 1, for simultaneously moving the valve stem 56 downwardly within the bore 14. The downward movement of the stem 56 moves the valve seat 48 and retainer member 50 downwardly agains the action of the spring 54 whereby the seat 48 is moved away from the valve port 46. This establishes communication between the chamber 27 and the interior of the bushing 42 whereby the fluid from the inlet port 100 will flow through the bore 102 into the chamber 27 and through the open valve port 46 for discharge through the port 94. The port 94 may be in communication with a suitable remotely disposed pressure opening valve (not shown) which opens upon the application of the fluid pressure for discharging fluid from the vessel, thus tending to balance or lower the fluid level within the vessel for restoring the normal conditions thereto.

Simultaneously with the opening of the valve port 46, the upper end 106 of the valve stem 56 moves downward away from the valve seat 34, and the seat 34 remains in a closed position against the port 32 whereby fluid from the port 92 may flow through the bushing 28 and into the central bore 68 of the stem 56, whereupon the fluid will be discharged through the aperture 86 for exhaust to atmosphere, or the like, through the port 90. The bore 92 is preferably in communication with a second remotely disposed pressure opening valve (not shown) so arranged to stop the flow of fluid to the vessel upon relieving of the pressure therefrom through the valve 10. Thus, the supply of fluid to the vessel is stopped simultaneously with the opening of a drain valve for restoring the normal fluid level within the vessel substantially immediately.

Conversely, if the fluid level within the vessel drops below the desired normal level, the link arm 76 will be rotated in a counter-clockwise direction, as indicated in FIG. 2, and the end 74 thereof will raise the valve stem 56 toward the position depicted in FIG. 2. In this instance, the upper end 106 of the stem 56 urges the valve seat 34 and the retainer member 36 upwardly against the pressure of the spring 40 for opening the valve port 32. However, the upper end 106, bearing against the valve seat 34, will close the bore 68 for precluding passage of the fluid from the bore 92 therethrough. It will be apparent that the flutes or grooves 38 provided on the outer periphery of the retainer 36 permit the retainer to reciprocate within the pocket or recess 24 without hinderance from any fluid which may be trapped above the retainer.

The opening of the valve port 32 permits fluid from the inlet port 100 to flow through the bore 102 and the chamber 25 and through the bushing 28 for discharge through the port 92. The fluid discharging from the port 92 is directed to the aforesaid pressure opening valve, which is so arranged in the fluid flow system for admitting fluid to the vessel upon the application of pressure from the valve 10. This supplies fluid for filling the vessel to raise the fluid level therein.

Simultaneously with the opening of the valve port 32, the lower end 104 of the valve stem 56 moves upwardly away from the valve seat 48 whereby the spring 54 will urge the valve seat 48 into a sealing engagement with the valve port 46 for a closing thereof. This precludes the flow of fluid from the chamber 27 into the bushing 42 and the bore 94. However, the bore 68 is open at the lower end thereof whereby the fluid in the port 94 will be exhausted through the bore 68 for discharge to atmosphere through the exhaust port 90. The exhausting of the fluid pressure from the port 94 relieves the pressure in the aforesaid pressure opening valve whereby the valve closes to preclude draining of the fluid from the vessel. Thus, the fluid level within the vessel tends to seek the normal level substantially immediately.

By way of summary, the valve stem 56 is lowered by the link arm 76 when the fluid level within the vessel rises above the desired normal level therefor, thus shunting the flow of the supply fluid from the inlet port 100 through the bore 102 and chamber 27 for discharge through the port 94 whereby the pressure opening valve (not shown) in communication therewith is opened for draining fluid from the vessel. Simultaneously, the upper valve port 32 is closed whereby the fluid from the port 92 is directed through the bore 68 of the valve stem for exhaust to atmosphere through the exhaust port 90, thus relieving the pressure on the pressure closing valve, which in turn is so arranged to preclude the flow of fluid to the vessel upon a relieving of the pressure through the valve 10. Conversely, when the fluid level within the vessel drops, the valve stem 56 is moved upwardly for shunting the flow of the fluid from the port 100 and chamber 25 through the port 92 for closing said remotely disposed valve so arranged to supply fluid to the vessel upon the application of pressure from the valve 10. Simultaneously, the fluid from the port 94 is directed through the bore 68 for exhaust to atmosphere through the exhaust port 90.

From the foregoing, it will be apparent that the present invention provides a novel reciprocating valve wherein a single valve stem functions for alternately opening and closing a plurality of valves in order to shunt the flow of a fluid in a fluid flow system. The novel valve provides an automatic control of the flow of the fluid in order to maintain a normal or desirable condition in the system. The novel valve may be utilized for controlling the level of a fluid within a vessel, or for controlling the operation of the system under desired pressure conditions. The valve is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:
1. A valve comprising a housing, a valve stem reciprocally disposed within the housing, fluid passageway means provided in the valve stem, a valve port provided at each end of the valve stem, slidable valve seat means provided for each valve port and cooperating with the valve stem for alternately opening and closing the valve ports, a fluid inlet provided in the housing in communication with each of the valve ports, a plurality of fluid outlet ports provided in the housing in communication with the fluid passageway, said valve ports alternately opened and closed upon reciprocation of the valve stem for selectively shunting the flow of the fluid from the inlet to the outlet ports, and means responsive to variable fluid conditions for automatically reciprocating the valve stem.

2. A valve comprising a housing, a longitudinal bore extending through the housing and having the opposite ends thereof open, cap members secured to the housing for closing the open ends of the bore, a valve stem reciprocally disposed within the bore, a fluid passageway extending through the valve stem and having both ends thereof open, a valve port secured in each open end of the bore and in the proximity of the respective open end of the fluid passageway, spring urged valve seats provided in the cap members for cooperation with each valve port and the corresponding open end of the fluid passageway, a fluid inlet provided in the housing in communication with each of the valve ports, a plurality of fluid outlets provided in the housing in communication with the fluid passageway, a bore provided in the housing in communication with one end of the fluid passageway, a second bore provided in the housing in communication with the opposite end of the fluid passageway, means for automatically reciprocating the valve stem whereby one of said valve ports will be opened simultaneously with the closing of the corresponding open end of the fluid passageway and the second of said valve ports will be closed with a simultaneous opening of the corresponding open end of the fluid passageway for shunting the flow of the fluid from the fluid inlet to the bores and from the bores to the fluid outlet.

3. A valve adapted to be interposed in a fluid flow system for controlling the flow of the fluid, and comprising a housing, a bore extending through the housing and having the opposite ends thereof, open, a valve stem reciprocally disposed within the bore, a fluid passageway extending through the valve stem and having the opposite ends thereof open, a valve port secured in each open end of the bore, a valve seat disposed at each end of the valve stem for cooperation therewith to alternately open and close the respective valve port and open end of the fluid passageway, a fluid inlet provided in the housing in communication with each valve port, a fluid outlet provided in the housing in communication with the fluid passageway, a bore provided in the housing in communication with one of said valve ports and the respective open end of the fluid passageway, a second bore provided in the housing in communication with the second of said valve ports and the respective open end of the fluid passageway, and means responsive to fluctuations of the fluid level in the flow system for automatic reciprocation of the valve stem for shunting the flow of the fluid from the fluid inlet to the bores and from the bores to the fluid outlet.

4. A valve comprising a housing, a valve stem reciprocally disposed within the housing, a fluid passageway extending through the valve stem and having the opposite ends thereof open, a valve port secured to the housing adjacent the opposed ends of the valve stem and in the proximity of the open ends of the fluid passageway, a reciprocal valve seat disposed in the housing at the opposed ends of the valve stem, each of said valve seats cooperating with the respective valve port and open end of the fluid passageway for alternately opening and closing thereof, fluid inlet means provided in the housing, fluid outlet means provided in the housing, and means for automatically reciprocating the valve stem for shunting the flow of fluid from the fluid inlet means to the fluid outlet means.

References Cited in the file of this patent
UNITED STATES PATENTS

| 2,032,426 | Magis | Mar. 3, 1936 |
| 2,441,201 | Ludwig | May 11, 1948 |
| 2,902,053 | Seddon | Sept. 1, 1959 |
| 2,927,603 | Willis | Mar. 8, 1960 |

FOREIGN PATENTS

| 223,528 | Australia | Aug. 17, 1959 |
| 501,030 | Canada | Mar. 30, 1954 |